United States Patent
Conibear

[11] 3,797,162
[45] Mar. 19, 1974

[54] RELEASABLE MOUNT MEANS FOR ANIMAL TRAP

[76] Inventor: Frank Ralph Conibear, 2170 Evergreen Pl., Victoria, British Columbia, Canada

[22] Filed: Apr. 24, 1972

[21] Appl. No.: 246,526

[52] U.S. Cl. .................................................... 43/90
[51] Int. Cl. ............................................. A01n 23/28
[58] Field of Search ...................... 43/90, 92, 88, 97

[56] References Cited
UNITED STATES PATENTS

| | | | |
|---|---|---|---|
| 2,701,428 | 2/1955 | Mau | 43/90 |
| 2,947,107 | 8/1960 | Lehn | 43/92 |
| 3,010,245 | 11/1961 | Conibear | 43/90 |
| 3,146,545 | 9/1964 | Frost | 43/90 |
| 3,421,251 | 1/1969 | Hofmeister | 43/92 |

Primary Examiner—Louis G. Mancene
Assistant Examiner—James H. Czerwonky

[57] ABSTRACT

An improved pivot means for a rotating frame animal trap wherein at least one of the sockets or apertures in which the pivot pins are rotatively seated are substantially enlarged to allow limited translatory, as well as rotative, motion of the pins therein when the trap is fired. This feature permits the trap frames to adjust relative to one another in response to an obstruction in one of the pairs of jaws, so that the other pair of jaws closes more tightly than otherwise would have been possible. Additionally, to facilitate its mounting, a bearing surface is fixed to such a trap or a known rotating frame trap, when the trap has an actuator associated with just the upper pair of adjacent frame ends. The bearing surface is fixed to one of the lower frame ends and adapted to cooperate with the other spaced apart lower frame end when the trap is in set position, to clamp about a mounting post, and thereby firmly hold the trap in upright position until the trap is fired. Notch-like means are formed in either the bearing surface or the corresponding portion of the other lower frame end to facilitate clamping of the post therebetween. When the trap is fired, the mounting post is no longer so clamped and the trap can fall free of it.

10 Claims, 3 Drawing Figures

PATENTED MAR 19 1974　　3,797,162

RELEASABLE MOUNT MEANS FOR ANIMAL TRAP

BACKGROUND OF THE INVENTION

This invention relates to improvements in the frame design of a rotating frame type of trap. By a "rotating frame" animal trap is meant a trap which comprises a pair of similar frames connected at adjacent ends by pivot means for relative rotation on a common axis so as to form by their sides two pairs of co-acting jaws. Heretofore, these frames have been substantially square or rectangular in shape. My co-pending application Ser. No. 208,372 describes a rotating frame animal trap in which the frames are of generally trapezoidal shape wherein the upper frame ends are of substantially greater length than the lower frame ends. At least one actuator, consisting of a coil spring having arms terminating in rings slidable along and encircling one pair of adjacent ends of the frames, is used to urge the two pairs of jaws towards and maintain them in closed position about the body of a trapped animal. In my U.S. Pat. No. 3,010,245, dated Nov. 28, 1961, such a rotating frame trap is described in which the ends which cooperate with the rings are shaped so that in the set position of the trap, these ends lie substantially parallel to each other, while the central portions of these ends, near the common axis of the frames, form a cross with each other within the rings on the arms of the coil spring. A trigger means (for example as described in my co-pending application Ser. No. 207,423), maintains the frames in open position when the trap is set, but when the trap is sprung releases the frames so as to permit, as a result of the action of the spring and rings on the ends, rapid rotation of the frames through an angle of about 90°, so that the jaws quickly strike and kill an animal in the trap. The trigger mechanism includes a restraint mechanism for releasably restraining one set of jaws and thereby maintaining the trap in set position against the action of the spring. The lower frame ends of the trap constitute its base when a trap having the trigger mechanism of Ser. No. 207,423 is in set position.

One difficulty encountered with known traps of this type, when both pairs of jaws are closing about the body of an animal, is that one set of jaws may become obstructed, thereby preventing the other set of jaws from closing tightly upon one part of the animal's body. For example, if one set of jaws of the trap were to close on the head of a mink, the other set of jaws, which would normally close tightly behind its shoulders might not so close if the first set of jaws did not have enough power to crush the animal's head; if the latter does not occur, the second set of jaws would be prevented from closing tightly and the mink would suffer a slow and agonizing death.

Another difficulty with known rotating frame animal traps of this type is in mounting the trap. While such known traps have heretofore been mounted in a variety of ways, and using a variety of mounting attachments, there has until now been no simple way of mounting the trap in an upright position so that, when the trap has been triggered, it falls from its mounted position and is freed from the mount. Up until now, these traps have for example, been staked in position by making use of the loop in the coil spring, or have been mounted on a nail or other solid projection by way of a hole drilled through the center of the pivot pin at the bottom of the trap. When an animal is caught therein, a trap which has been so mounted remains in that position with the dead animal in it. Such an arrangement may be satisfactory in some circumstances. In others, however, such as when the traps are set in a series along a floating log or plank in the water for muskrats or on an inclined pole against a tree for squirrels, the dead animal not only blocks the way for the next animal wishing to pass thay way, but also, in many instances, frightens other animals away, thereby minimizing the effectiveness of the remaining traps in the series.

SUMMARY OF THE INVENTION

It has now been surprisingly found with respect to the square rectangular or trapezoidal traps of the above-mentioned type that a more effective and humane trap is obtained by enlarging one or both of the sockets or apertures in which the pivot pins are rotatively seated to allow limited translatory, as well as rotative motion of the pins. The preferred form of rotating frame trap according to the present invention has an improved pivot means which comprises a pair of pins, each pin being centrally located on a frame end at opposite ends of the trap and disposed along the axis of rotation. Two corresponding surrounds, each being centrally located on the frame end adjacent to the end having the pin at opposite ends of the trap, loosely house the respective pins. This construction permits a limited degree of relative translatory movement of the frames of the trap in response to an obstruction in one set of jaws while the trap is closing, so that the other set of jaws closes more tightly, than otherwise possible, under the continued bias of the actuator. Alternatively, one of the pins may be loosely housed for rotative and translatory motion in such a surround, while the other pin is fitted tightly in a socket or aperture so that only rotative motion of the latter pin is permitted.

Additionally or alternatively, when the lower frame ends of the trap are intended to be the base thereof, a bearing surface may be fixed to the lower end of one frame, facing a corresponding portion of the lower end of the other frame when the trap is in set position. This bearing surface and the corresponding portion of the lower end of the other frame cooperate to act as a clamp when the trap is in set position, and firmly engage about any fixed pin-like projection or mounting post, whereby the trap is firmly but releasably maintained in an upright position. When the set trap, so mounted, is triggered, the mounting post is released from clamped engagement with the bearing surface and the corresponding portion of the lower end of the other frame, and the trap is permitted to fall free of the mounting post. Of course when used for example on a floating log, the trap can still be secured by chain or the like to the log so that it is not lost in the water upon its release.

When such a bearing surface is used in conjunction with the above described improved pivot means, the bearing surface is preferably positioned on the same side of the pivot means, when the trap is in set position, as the trigger restraint mechanism. When the trap has been set and is ready for mounting, the trigger restraint mechanism acts as a fulcrum for relative translatory movement of the lower frame ends. By slightly further compressing the sides of the trap on the opposite side of the pivot means from the trigger restraint mechanism, against the bias of the actuator, the resultant relative translatory movement of the lower frame ends of the trap increases the distance between the bearing surface and corresponding portion of the lower end of the other frame, thereby facilitating the mounting of the trap.

DESCRIPTION OF THE DRAWINGS

In the following description of the illustrated embodiments, directional terms such as "lower," "upright," etc., have been used to assist in describing and defining the parts of the invention relative to each other and are not intended to infer any particular orientation of the invention. In fact the invention can effectively operate in many different orientations.

Some preferred embodiments of the invention will now be described with reference to the accompanying drawings in which.

Similar features are referred to by similar reference numbers in the drawings.

DESCRIPTION OF THE PREFERRED EMBODIMENTS

Figure 1:
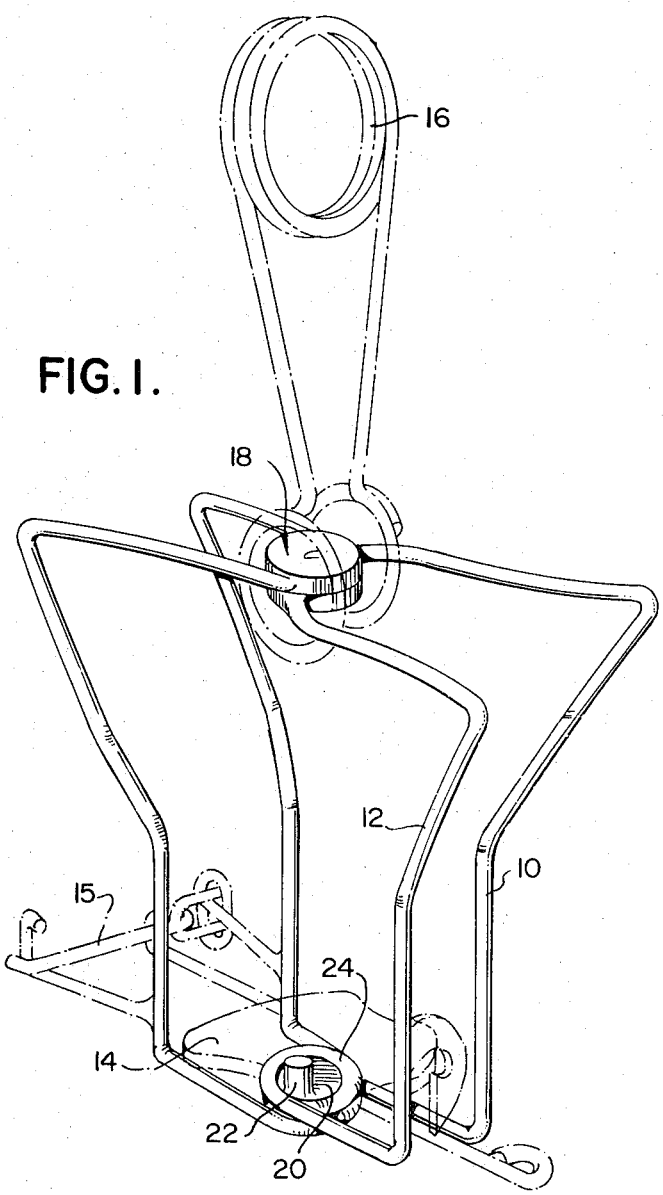
FIG. 1 is a perspective view partially in phantom illustrating in vertical, set position, a rotating frame trap having features of the traps described in my co-pending applications Ser. Nos. 208,372, and 207,423, and illustrating therein an improved pivot means of the present invention.

The animal trap illustrated in FIG. 1 consists of two frames 10 and 12, a trigger means indicated generally by 14 having a restraint means indicated generally by 15, and an actuator 16. The frames are rotatable about the pivot means indicated generally by 18 and 20. The lower pivot means comprises a pin 22 fixed perpendicularly to the central portion of the lower end of frame 10. Pin 22 is loosely housed within a circular surround 24 forming an aperture in the central portion of the lower, adjacent end of frame 12. A similar pivot means is located at the top end of the trap. When the trap is closing, if one set of jaws meets greater resistance than the other set of jaws (for example by an obstructing part of the animal's body such as the head), the obstruction will act as a fulcrum for the frames and pin 22 will slide relative to and within aperture 24 to enable the set of jaws which encounters the least resistance to continue to move closer together. The trap frames thereby automatically adjust, by relative translatory movement, so that the "unobstructed" set of jaws closes more tightly about another, possible vulnerable region of the animal's body. This ensures a more humane and faster killing of the animal under such circumstances. Compared with known rotating frame traps in the case of a mink having its head caught in one set of jaws and a body part in the other, the time in which the mink would be killed in this improved trap could be considerably reduced, for example conceivably from 24 hours to 2 to 5 minutes.

While the drawings indicate the apertures in which the pivots move to be of circular shape, such apertures may alternatively be elongated and still permit the desired translatory movement of the frames. Of course, in this case the apertures would have to be properly oriented on the frame ends in the direction of likely relative translatory movement to produce the most effective results. The proper orientation of the apertures would in this case depend on the operation and purpose of the particular trap, and can be readily determined by experiment.

Figure 2:
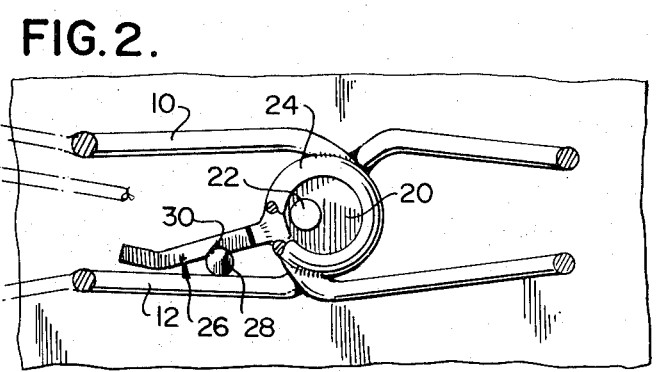
FIG. 2 is a plan view of a mount and the lower portion of the frames of an alternative embodiment of a rotating frame trap, which embodiment features a mounting means according to the present invention.
Figure 3:
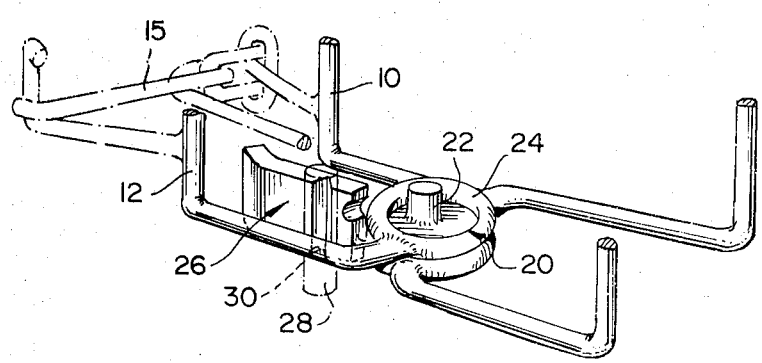
FIG. 3 is a perpective view of the mount and the lower portion of the trap of FIG. 2.

In the embodiment illustrated in FIGS. 2 and 3, a bearing surface 26 is fixed to the lower end of frame 10 on the side proximate to and facing the corresponding lower end portion of frame 12 and positioned on the same side of the pivot means as the trigger restraint mechanism 15, when the trap is in set position. Bearing surface 26 is so positioned that it, together with a corresponding portion of the lower end of frame 12, can releasably engage a mounting post 28, to hold the trap firmly in upright position. In the illustrated embodiment, bearing surface 26 has a vertical notch 30 which facilitates the positioning of the mounting post 28 between the lower end of frame 12 and the bearing surface 26 and assists in holding the mounting post therebetween so that the trap is held in upright position.

In order to secure the trap to mounting post 28, the set jaws opposite trigger restraint mechanism 15 and bearing surface 26 are squeezed together. The trigger restraint mechanism then acts as a fulcrum and pivot pin 22 is displaced relative to and within aperture 24 so that the distance between bearing surface 26 and the corresponding portion of the lower end of frame 12 is increased. The mounting post 28 can then be easily slid into position therebetween, after which the pressure on the jaws in question is released permitting bearing surface 26 and the corresponding lower end portion of frame 12 to clamp securely about the post.

As an alternative embodiment, not illustrated in the drawings, bearing surface 26 may be an integral portion of the lower end of frame 10. In this case, the lower portion of frame 10 would project towards the corresponding portion of frame 12 so that the desired engagement of mounting post 28 between the lower frame ends could be achieved.

The use of such a bearing surface on the rotating frame animal trap greatly increases the versatility and effectiveness of this trap. Nails driven through an appropriate base can be used to hold the trap from posts or stakes at any desired height from the ground or at any desired depth below the surface of the water. They may also be used to hold the traps upright on any flat surface such as in axe-flattened spot on a log, a board, a floor, or even a stick, which could be embedded in the earth or snow to provide a firm support for the trap. In all cases, when such a trap, mounted in such a location by way of a nail, is sprung by an animal, the trap will jump clear of the mount. In field practice, for example, when trapping muskrats, a number of traps can be held upright in a row on a floating log or plank so that, when one muskrat is caught in one trap, it and the sprung trap will fall into the water leaving the remaining traps set and ready for the next muskrat. Alternatively, for squirrels, a large pole can be placed against a tree at an inclined angle and a number of traps can be set on the pole one after the other. The first squirrel which attemps to take a short cut up the pole will get caught and the trap and squirrel will then fall off the pole. In a similar manner, the second squirrel will get caught on the next trap. In all these cases, if the trap had not fallen off the mount and instead had remained there with the dead animal therein, other animals would have been frightened by the sight of the dead animal on the "path" or obstructed by the sprung trap and dead animal, and would thus not have proceeded to the other set traps.

Thus, it can be readily seen that the necessity for expensive or complicated holding arrangements for traps of this type is avoided and larger "catches" are made possible for the trapper.

What I claim is:

1. In an animal trap of the type having two similar frames each having sides serving as jaws and upper and lower ends extending therebetween, and which are pivotally connected through adjacent ends for relative rotation between set and closed positions about a common axis of rotation, an actuator associated with a pair of adjacent frame ends and capable of biasing the frames toward, and upon release rapidly and forcefully effecting such rotation, and a trigger means, including a restraint mechanism for releasably restraining one set of jaws and thereby maintaining the trap in set position against the bias of the actuator, an improved pivot means which comprises:
   1. a pair of pins, each pin being centrally located on a frame end at opposite ends of the trap and, disposed along the axis of rotation towards the adjacent end of the other frame;
   2. a pair of corresponding surrounds, each being centrally located on a frame end at opposite ends of the trap, and at least one of said surrounds having an interior configuration substantially greater than the exterior configuration of one of said pins to loosely house the respective one pin from the adjacent frame end whereby, while the trap is closing, said loosely housed pins and consequently the frames are permitted a limited degree of translatory movement in response to an obstruction in one set of jaws so that the other set of jaws can under the continued bias of the actuator, close more tightly than would have otherwise been possible.

2. An animal trap according to claim 1 wherein both of said surrounds loosely house the respective pins.

3. An animal trap according to claim 2 wherein the pins are located at opposite ends of one frame and the surrounds are located at opposite ends of the other frame.

4. An animal trap according to claim 2 wherein said surrounds are circular apertures.

5. An animal trap according to claim 2 wherein said surrounds are elongated apertures.

6. An animal trap according to claim 4 wherein only one actuator associated with the upper pair of adjacent frame ends biases the frames, wherein the lower pair of adjacent frame ends are adapted to be the base thereof and wherein said trap additionally comprises, when the trap is in set position, a bearing surface, fixed to one of the frame ends of the lower pair of adjacent frame ends on the side proximate to and facing a corresponding portion of the other lower frame end and positioned on the same side of the pivot means as the trigger restraint mechanism for cooperating with said corresponding portion of the lower end of the other frame to releasably clamp therebetween a mounting post to hold the trap firmly in upright position, whereby, when the trap is so mounted and fired, said mounting post will be released from engagement between said bearing surface and said corresponding portion of the other lower frame end, and the trap will be permitted to fall free of the mounting post.

7. A trap according to claim 6 wherein said bearing surface is a flat, elongated surface.

8. A trap according to claim 7 wherein said bearing surface has a notch in its face perpendicular to the base of the trap to facilitate mounting of the trap on said mounting post.

9. A trap according to claim 6 wherein said bearing surface is an integral portion of the lower frame end.

10. In an animal trap of the type having two similar frames each having sides serving as jaws and upper and lower ends extending therebetween, and which are pivotally connected through adjacent ends for relative rotation between set and closed positions about a common axis of rotation, an actuator associated with the upper pair of adjacent frame ends and capable of biasing the frames toward, and upon release rapidly and forcefully effecting, such rotation, a trigger means including a restraint mechanism for releasably restraining one set of jaws and thereby maintaining the trap in set position against the bias of the actuator, wherein the lower part of adjacent frame ends are adapted to the base thereof, an improved means for mounting said trap which comprises, when the trap is in set position, a bearing surface fixed to one of the frame ends of the lower pair of adjacent frame ends on the side proximate to and facing a corresponding portion of the other lower, spaced apart, frame end, either said bearing surface or said corresponding portion having notch-like means for cooperating with either said corresponding portion of said other lower frame end or said bearing surface, respectively, to releasably clamp therebetween in said space a mounting post and thereby firmly maintain the trap in an upright position, whereby, when the trap is so mounted and fired, said mounting post will be released from engagement between said bearing surface and said corresponding portion of said other lower frame end, and the trap will be permitted to fall free of the mounting post.

* * * * *